United States Patent [19]

Beard

[11] Patent Number: 5,753,119
[45] Date of Patent: May 19, 1998

[54] ROTARY FILTER ASSEMBLY WITH BLOWBACK OUTLET ADJUSTMENT

[75] Inventor: Jon O. Beard, East Taunton, Mass.

[73] Assignee: Baker Hughes Incorporated, Houston, Tex.

[21] Appl. No.: 626,279

[22] Filed: Apr. 4, 1996

[51] Int. Cl.⁶ .......................... B01D 33/50; B01D 33/073
[52] U.S. Cl. .......................... 210/391; 210/393; 210/402; 210/406
[58] Field of Search .................... 210/393, 402, 210/406, 391

[56] References Cited

U.S. PATENT DOCUMENTS

| | | |
|---|---|---|
| 2,352,303 | 6/1944 | Young. |
| 3,638,797 | 2/1972 | Heckman. |
| 4,261,822 | 4/1981 | Richardson. |
| 5,164,086 | 11/1992 | Hopgood. |
| 5,265,447 | 11/1993 | Bilodeau. |

FOREIGN PATENT DOCUMENTS

| | | |
|---|---|---|
| 759193 | 8/1934 | France. |
| 1027184 | 4/1958 | Germany. |
| 1082881 | 6/1960 | Germany. |
| 28 34 393 | 1/1979 | Germany. |
| 36 28 203 | 7/1988 | Germany. |
| 38 37 956 | 5/1990 | Germany. |
| 9310904 U | 2/1993 | Germany. |
| WO92/06766 | 11/1992 | WIPO. |

Primary Examiner—Thomas M. Lithgow
Attorney, Agent, or Firm—R. Neil Sudol; Henry D. Coleman

[57] ABSTRACT

A filter assembly comprises a tank, a support pipe disposed at least partially inside the tank, and a filter drum disposed inside the tank, the drum being rotatably mounted to the support pipe for rotation thereabout. The drum carries a filter element and has an inner surface. A suction source communicates with the support pipe to generate an underpressure inside the drum for pulling filtrate through the filter element from the tank during rotation of the drum. A blowback pipe extends into the support pipe and is provided at one end with a pipe section traversing the support pipe and extending toward the inner surface of the drum. A shoe or valve plate having a low-friction outer surface is connected to the pipe section and is disposed between the support pipe and the inner surface of the drum. The shoe may be provided with an elongate outlet slot extending parallel to an axis of rotation of the drum. An adjustment mechanism is coupled to the shoe for shifting that element radially relative to the support pipe and the drum to maintain the low-friction outer surface of the shoe in substantial engagement with the inner surface of the drum, in opposition to a pressure gradient tending to force the shoe radially inwardly.

15 Claims, 3 Drawing Sheets

ROTARY FILTER ASSEMBLY WITH BLOWBACK OUTLET ADJUSTMENT

BACKGROUND OF THE INVENTION

This invention relates to a rotary filter. More particularly, this invention relates to a rotary vacuum filter.

Rotary vacuum filters are in widespread use in the chemical, food, pharmaceutical and mining industries. During the production process, solids are removed from a slurry via a rotary vacuum filtration unit. The filtration unit includes a cylindrical filter drum rotatably disposed inside a housing. The slurry is fed to the housing to a point radially outward of the filter. Suction applied inside the filter drum draws the liquid components of the slurry through the filter, with the solids being deposited in a layer called a "cake" on the outer cylindrical surface of the drum.

As the filter drum rotates, the deposited layer is often times transported past a washing station where a washing fluid or liquor is dispensed onto the layer and drawn through the filter into the rotating drum. Subsequently, the cake rotates to a discharge station where a jet of pressurized gas from inside the rotating cylinder pushes the deposited cake from the outer surface of the filter and into a discharge outlet.

The providing of pressurized gas to remove the filter cake from the outer surface of the drum can lead to inefficiencies during filter operation. Leakage of "blowback" gas (air) at the discharge station will reduce the vacuum or underpressure inside the filter unit, thus reducing the filtration or cake extraction rate.

SUMMARY OF THE INVENTION

A filter assembly comprises, in accordance with the present invention, a tank, a support pipe disposed at least partially inside the tank, and a filter drum disposed inside the tank, the drum being rotatably mounted to the support pipe for rotation thereabout. The drum carries a filter element and has an inner surface. A suction source communicates with the support pipe to generate an underpressure inside the drum for pulling filtrate through the filter element from the tank during rotation of the drum. A blowback pipe extends into the support pipe and is provided at one end with a pipe section traversing the support pipe and extending toward the inner surface of the drum. A separate pipe is used for blowback as opposed to an integral compartment or component of the supporting pipe or girt. A shoe or valve plate having a low-friction outer surface is connected to the pipe section and is disposed between the support pipe and the inner surface of the drum. The shoe may be provided with an elongate outlet slot extending parallel to an axis of rotation of the drum. An adjustment mechanism is coupled to the shoe for shifting that element radially relative to the support pipe and the drum to maintain the low-friction outer surface of the shoe in substantial engagement with the inner surface of the drum, in opposition to a pressure gradient tending to force the shoe radially inwardly.

The shoe or valve plate and the adjustment mechanism associated therewith serve to facilitate the maintenance of a low-leakage seal between an output end of the blowback pipe or header and the drum. Thus, the efficiency of the filtration process is enhanced.

Pursuant to another feature of the present invention, a thrust block of low-friction material is mounted to the support pipe and is disposed between the support pipe and the inner surface of the drum, on a side of the support pipe opposite the shoe. The thrust block is thus aligned opposite the "blowback" to balance the forces induced by the differential pressure between the vacuum in the drum and the positive pressure in the blowback area. The thrust block has an arcuate outer surface conforming in contour to the inner surface of the drum so that the thrust block is in uniform contact with the inner surface of the drum.

Preferably, the adjustment mechanism includes a plurality of set screws connected to the shoe and disposed in contact with the support pipe. More preferably, the set screws are four in number and are disposed in a rectangular configuration. The set screws are accessible directly through the filter drum and are easily adjusted to close any gap between the outer surface of the shoe and the inner surface of the drum. This mechanism provides for an adjustment in multiple planes in addition to the in and out adjustment for current mechanisms. This is accomplished by providing a flexible connection, such as a hose, and adjustment devices in each corner of the valve plate, which provide universal adjustment of the clearance. The outer surface of the shoe is machined or polished to have an arcuate contour matching the curvature of the drum's inner surface.

The outer surfaces of the blowback shoe and thrust block are preferably formed from polytetrafluoroethylene or glass filled tetrafluoroethylene.

According to another feature of the present invention, a vacuum header or pipe extends into the support pipe. The vacuum header has its own pipe section which traverses the central support pipe and extends toward the inner surface of the drum. The suction source is operatively connected to the vacuum header at an end thereof opposite the pipe section of the header. This header is an integral compartment within the support pipe in current configurations.

DETAILED DESCRIPTION

Figure 1:
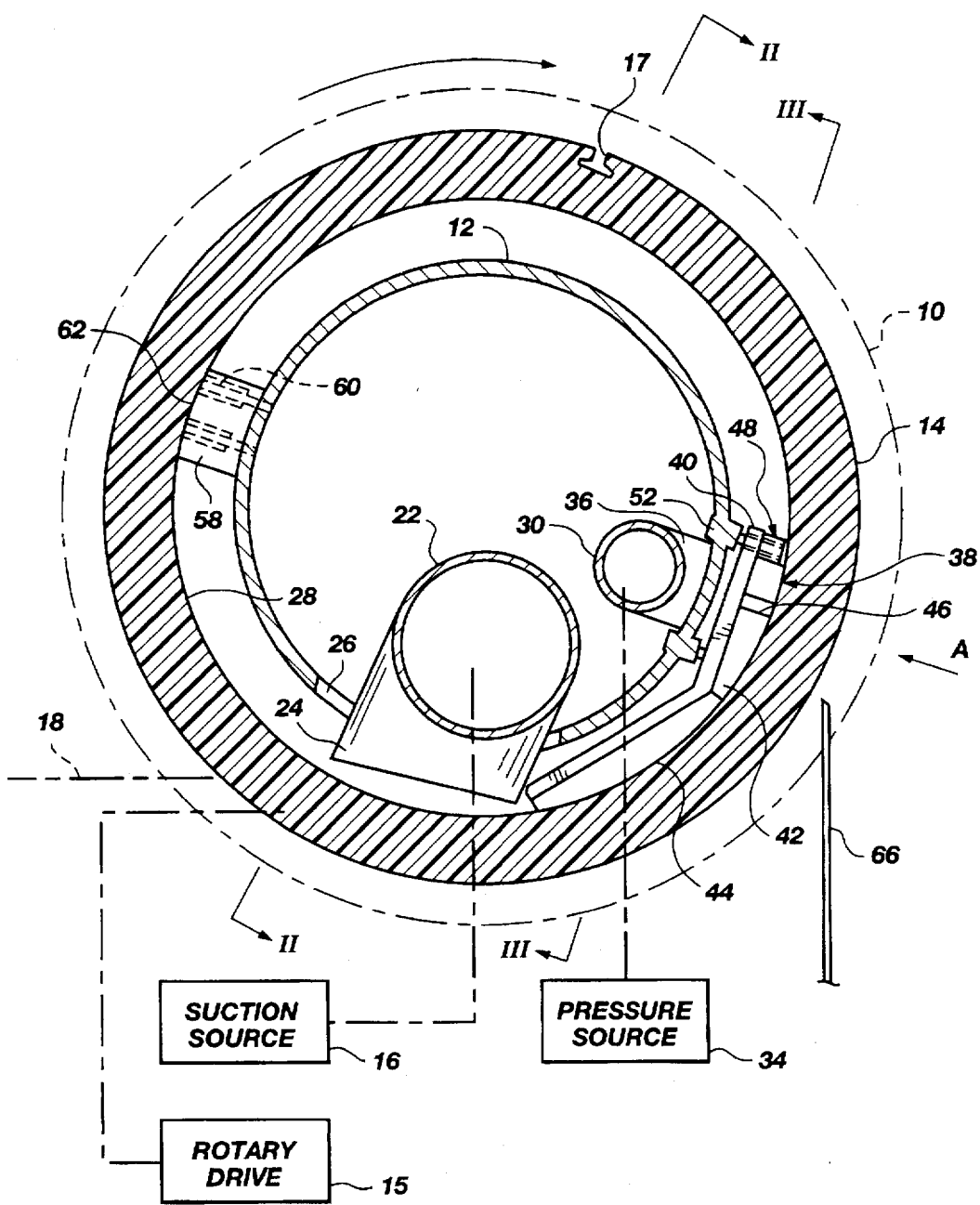
FIG. 1 is a transverse cross-sectional view of a rotary filter in accordance with the present invention.

As illustrated in FIG. 1, a rotary type filter assembly comprises an outer tank or case 10, a support pipe or "girt" 12 disposed at least partially inside the tank, and a filter drum 14 disposed inside the tank. Drum 14 is rotatably mounted to support pipe 12 for rotation thereabout under the action of a rotary drive 15. Drum 14 carries one or more filter elements such as a fabric strip (not shown) which is attached to drum 14 at a groove 17 and is at least coextensive with apertures (not shown) provided in the drum. A suction source 16 communicates with support pipe 12 to generate an underpressure inside drum 14 for pulling filtrate through the filter element(s) from tank 10 during rotation of drum 14 by drive 15. A slurry or suspension to be filtered is disposed in tank 10 up to a pre-determined submergence level 18.

Figure 2:
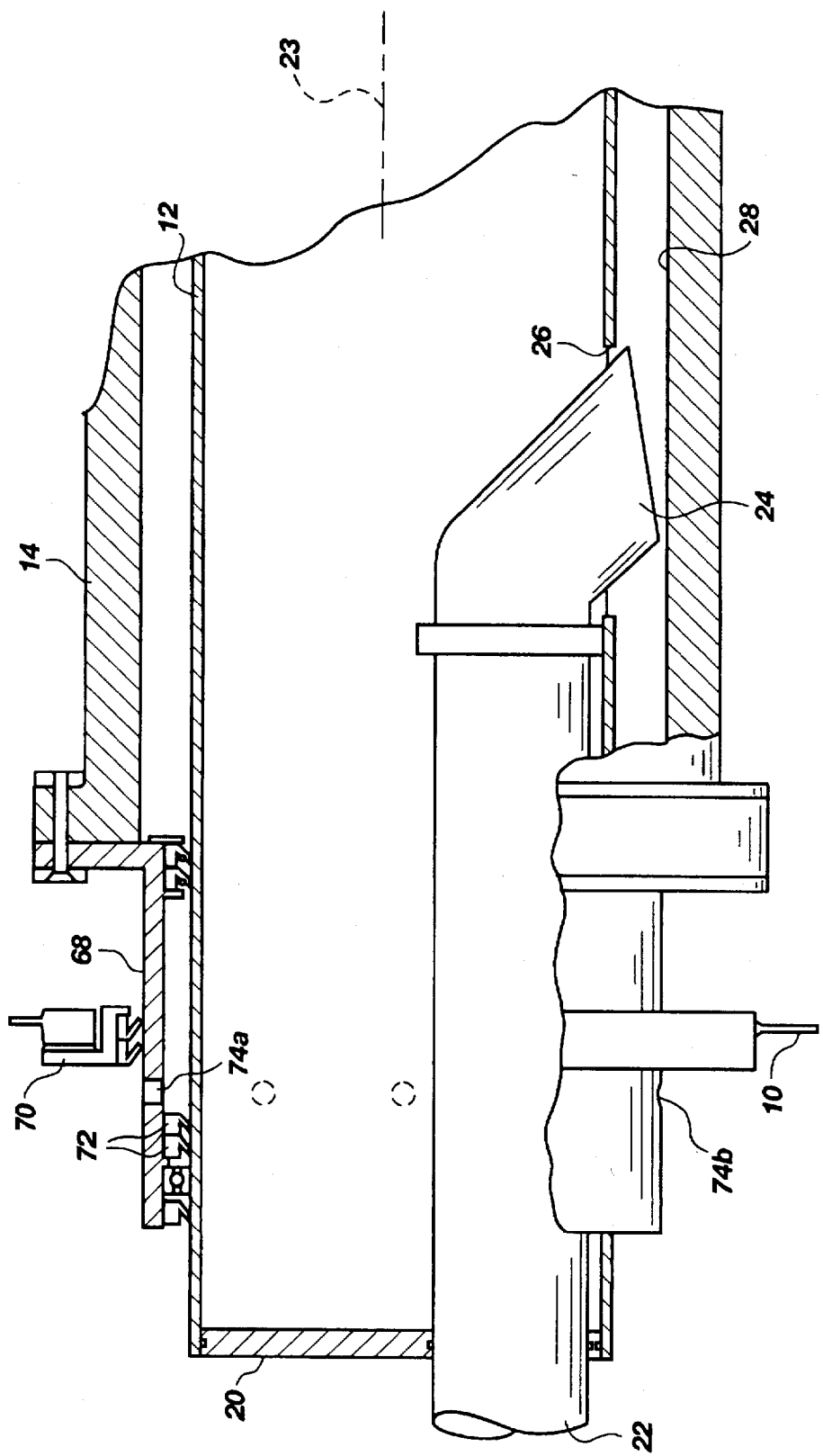
FIG. 2 is a partial longitudinal cross-sectional view taken along line II—II in FIG. 1.

Suction source 16 may be connected to a polymeric transverse cover plate 20 (FIG. 2) via a tubular member (not illustrated) terminating at the support plate. As illustrated in FIGS. 1 and 2, suction source 16 may be connected to a vacuum application and filtrate extraction header 22 which traverses cover plate 20 and extends generally parallel to a rotation axis 23 of drum 14. At a free end, vacuum header 22 is provided with an angled pickup pipe section 24 which traverses an opening 26 in support pipe 12 and terminates proximately to an inner surface 28 of drum 14, at a lower portion thereof For purposes of removing a filter cake (not shown) adhering to an outer surface 34 of drum 14 during operation of the filter assembly, a blowback pipe 30 is provided. As shown in FIG. 1, blowback pipe 30 extends into support pipe 12 generally parallel to vacuum header 22.

Figure 3:
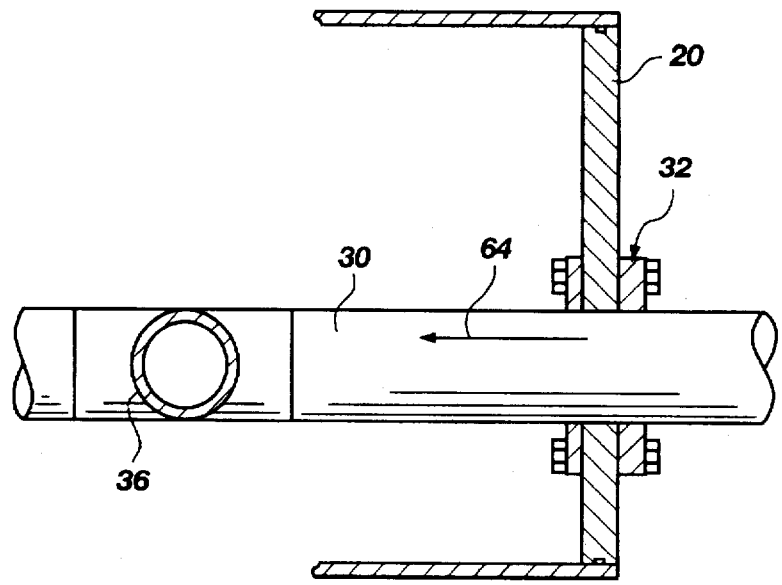
FIG. 3 is a partial longitudinal cross-sectional view taken along line III—III in FIG. 1.

As illustrated in FIG. 3, blowback pipe 30 traverses cover plate 20 and is mounted thereto via a clamping assembly 32. At one end, blowback pipe 30 communicates with a pressure source 34. At an opposite end, blowback pipe 30 is provided with a radially oriented pipe section 36 which traverses support pipe 12 and extends toward inner surface 28 of drum 14. At a radially outer end, pipe section 36 is provided with a shoe or valve member 38 including a metal plate 40 and a low-friction shoe or pad 42. Shoe or pad 42 is made of polytetrafluoroethylene or glass filled tetrafluoroethylene and has an outer surface 44 in sliding contact with inner surface 28 of drum 14. Outer surface 44 of shoe 42 is machined or polished to have an arcuate contour matching the curvature of inner surface 28 of drum 14. Valve or shoe member 38 is connected to pipe section 36 and is disposed between support pipe 12 and inner surface 28 of drum 14. Valve or shoe member 38 is formed with an elongate outlet slot 46 extending parallel to drum rotation axis 23.

Figure 4:
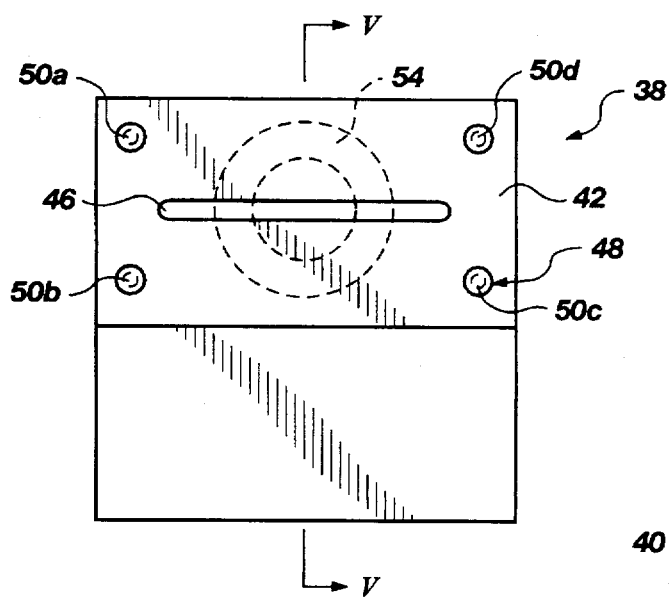
FIG. 4 is an elevational view, taken in a direction A in FIG. 1, of a shoe or valve member illustrated in FIG. 1.

An adjustment mechanism 48 is coupled to valve or shoe member 38 for shifting that element radially relative to support pipe 12 and drum 14 to maintain the low-friction outer surface 44 of the shoe in substantial engagement with drum inner surface 28, in opposition to a pressure gradient tending to force valve or shoe member 38 radially inwardly, and to provide for coplanar adjustment of the contours to affect the afore-mentioned engagement. Valve or shoe member 38 and adjustment mechanism 48 associated therewith serve to facilitate the maintenance of a low-leakage seal between an output end of blowback pipe or header 30 and drum 14. Thus, the efficiency of the filtration process is enhanced. As depicted in FIGS. 1 and 4, adjustment mechanism 48 includes four substantially radially oriented adjustment screws 50a, 50b, 50c, 50d disposed in a rectangular configuration and connected to valve or shoe plate 40. The radially inner ends (not separately designated) of adjustment screws 50a, 50b, 50c, 50d are in contact with seats 52 provided on support pipe or girt 12.

Figure 5:
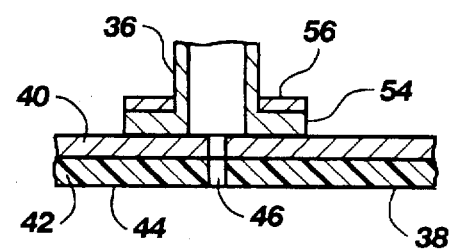
FIG. 5 is a partial cross-sectional view taken along line V—V in FIG. 4.

As shown in FIGS. 4 and 5, pipe section 36 is provided at a radially outer end with a flange 54 connected to valve or shoe plate 40. On a side of flange 54 opposite plate 40 is provided a stainless steel backup ring 56.

As illustrated in FIG. 1, a thrust block 58 of low-friction material, such as polytetrafluoroethylene or glass filled tetrafluoroethylene, is mounted to support pipe 12 via bolts 60 and is disposed between support pipe 12 and inner surface 28 of drum 14. More specifically, thrust block 58 is disposed on a side of support pipe 12 opposite valve or shoe member 38 and accordingly, opposite the pressure gradient tending to force valve or shoe member 38 and thus support pipe 12 radially inwardly. Thrust block 58 is accordingly aligned opposite the "blowback" to balance the forces induced by the differential pressure between the vacuum in drum 14 and the positive pressure in the blowback area. Thrust block 58 has an arcuate outer surface 62 conforming in contour to inner surface 28 of drum 14 so that the thrust block is in uniform contact with the inner surface of drum 14.

During operation of the filter assembly discussed above, pressurized air is fed along blowback pipe 30, as indicated by an arrow 64 in FIG. 3. The output end of blowback pipe section 36, and more specifically arcuate outer surface 44 of valve or shoe member 38, is maintained in contact with inner surface 28 of drum 14 owing to the adjustability in valve plate position provided by mechanism 48 and further owing to thrust block 58. The thrust block ensures that support pipe 12 remains in an essentially fixed transverse position despite the radially inward pressure exerted at the blowback outlet nozzle slot 46. Cake ejected from the filter element on the outer surface of drum 14 by the blowback pressure is guided along a path represented in FIG. 1 by a wall 66.

As illustrated in FIG. 2, drum 14 is provided at an end (each end) with a bearing housing 68 which is in contact along an outer side with a sealing ring 70 connected to tank 10. On an inner side, bearing housing 68 carries seals 72 which contact support pipe 12. A plurality of drain holes 74a, 74b are formed in bearing housing 68. Vacuum application and filtrate extraction header 22 is attached to support pipe 12 via a polypropylene support bracket 76.

U.S. Pat. No. 2,352,303 is incorporated by reference herein, to clarify the basic structural features and operating modes of a vacuum filtration unit, Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A filter assembly comprising:

a tank;

a support pipe disposed at least partially inside said tank;

a filter drum disposed inside said tank, said drum being rotatably mounted to said support pipe for rotation thereabout, said drum carrying a filter element and having an inner surface;

a suction source communicating with said support pipe to generate an underpressure inside said drum for pulling filtrate through said filter element from said tank during rotation of said drum;

a blowback pipe extending into said support pipe, said blowback pipe being provided at one end with a pipe section traversing said support pipe and extending toward said inner surface;

a shoe connected to said pipe section and disposed between said support pipe and said inner surface of said drum, said shoe having a low-friction outer surface;

an adjustment mechanism coupled to said shoe for shifting said shoe radially relative to said support pipe and said drum to maintain said outer surface in substantial engagement with said inner surface of said drum, in opposition to a pressure gradient tending to force said shoe radially inwardly; and a substantially rigid thrust block of low friction material mounted to said support pipe and disposed between said support pipe and said inner surface, on a side of said support pipe substantially opposite said shoe, to oppose a radially inward thrust exerted against said support pipe by said shoe and said pipe section and thereby maintain said support pipe in an essentially fixed transverse position relative to said tank in opposition to said radially inward thrust.

2. The assembly defined in claim 1 wherein said thrust block has an arcuate outer surface conforming in contour to said inner surface, said arcuate outer surface being in contact with said inner surface.

3. The assembly defined in claim 1 wherein said adjustment mechanism includes a plurality of adjustment screws connected to said shoe, said adjustment screws being disposed in contact with said support pipe.

4. The assembly defined in claim 3 wherein said adjustment screws are four in number and are disposed in a rectangular configuration.

5. The assembly defined in claim 1 wherein said outer surface is formed from polytetrafluoroethylene or glass filled tetrafluoroethylene and conforms in contour to said inner surface.

6. The assembly defined in claim 1 wherein said shoe is provided with an elongate outlet slot extending parallel to an axis of rotation of said drum.

7. The assembly defined in claim 1, further comprising a vacuum header or pipe extending into said support pipe, said vacuum header or pipe having an additional pipe section traversing said support pipe and extending toward said inner surface, said suction source being operatively connected to said vacuum header or pipe at an end thereof opposite said additional pipe section.

8. A filter assembly comprising:

a tank;

a support pipe disposed at least partially inside said tank;

a filter drum disposed inside said tank and rotatably mounted to said support pipe for rotation about said support pipe, said drum carrying a filter element and having an inner surface;

a suction source communicating with said support pipe to generate an underpressure inside said drum for pulling filtrate through said filter element from said tank during rotation of said drum;

a blowback pipe extending into said support pipe, said blowback pipe being provided at one end with a pipe section traversing said support pipe and extending toward said inner surface, said pipe section being coupled to said support pipe; and a substantially rigid thrust block of low friction material mounted to said support pipe and disposed between said support pipe and said inner surface, on a side of said support pipe substantially opposite said pipe section, to ensure that said support pipe remains in an essentially fixed transverse position relative to said tank in opposition to a radially inward pressure exerted on said support pipe by said pipe section.

9. The assembly defined in claim 8, further comprising a valve plate mounted to said pipe section and disposed between said support pipe and said drum, said valve plate having a low-friction outer surface in contact with said inner surface, further comprising an adjustment mechanism coupled to said valve plate for shifting said valve plate relative to said support pipe and said drum to maintain said outer surface in substantial engagement with said inner surface of said drum, in opposition to a pressure gradient tending to force said valve plate radially inwardly.

10. The assembly defined in claim 9 wherein said adjustment mechanism includes four adjustment screws disposed in a rectangular configuration.

11. The assembly defined in claim 10 wherein said thrust block has an arcuate outer surface conforming in contour to said inner surface, said arcuate outer surface being in contact with said inner surface.

12. In a filter assembly wherein suction is applied inside a rotating filter drum to draw filtrate through said drum and wherein a blowback member extends to an inner surface of said drum to remove particulate material caked on an outer surface of said drum, said drum being rotatably mounted about a support pipe, the improvement comprising a substantially rigid block disposed between said support pipe and said drum on a side thereof essentially opposite said blowback member to counteract a radially inward thrust exerted against said support pipe by said blowback member and thereby maintain said support pipe in an essentially fixed transverse position relative to said drum.

13. The improvement defined in claim 12, further comprising a valve plate mounted to said blowback member and disposed between said support pipe and said drum, said valve plate having a low-friction outer surface in contact with said inner surface, further comprising an adjustment mechanism coupled to said valve plate for shifting said valve plate relative to said support pipe and said drum to maintain said outer surface in substantial engagement with said inner surface of said drum, in opposition to a pressure gradient tending to force said valve plate radially inwardly.

14. The improvement defined in claim 13 wherein said adjustment mechanism includes four adjustment screws disposed in a rectangular configuration.

15. The improvement defined in claim 14 wherein said thrust block has an arcuate outer surface conforming in contour to said inner surface, said arcuate outer surface being in contact with said inner surface.

* * * * *